(12) United States Patent
Magarotto et al.

(10) Patent No.: US 11,346,492 B2
(45) Date of Patent: May 31, 2022

(54) FIXING SYSTEM FOR PANELS AND TURBOMACHINE ENCLOSURE COMPRISING SUCH SYSTEM

(71) Applicant: NUOVO PIGNONE TECNOLOGIE SRL, Florence (IT)

(72) Inventors: Andrea Magarotto, Florence (IT); Pierluigi Tozzi, Florence (IT); Domenico Zaffino, Florence (IT); Emanuele Checcacci, Florence (IT); Valentina Bisio, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 16/077,137

(22) PCT Filed: Feb. 6, 2017

(86) PCT No.: PCT/EP2017/052518
§ 371 (c)(1),
(2) Date: Aug. 10, 2018

(87) PCT Pub. No.: WO2017/137345
PCT Pub. Date: Aug. 17, 2017

(65) Prior Publication Data
US 2019/0032839 A1    Jan. 31, 2019

(30) Foreign Application Priority Data
Feb. 12, 2016 (IT) .................. 102016000014782

(51) Int. Cl.
*F16M 1/04* (2006.01)
*F16B 5/00* (2006.01)
(Continued)

(52) U.S. Cl.
CPC .............. *F16M 1/04* (2013.01); *E04B 1/8218* (2013.01); *E04B 1/8409* (2013.01); *E04B 2/721* (2013.01);
(Continued)

(58) Field of Classification Search
CPC ...... E04B 1/8218; E04B 1/8409; E04B 2/721; F16M 1/04; F16B 5/0072; F16B 5/0685; E04C 3/02
See application file for complete search history.

(56) References Cited

U.S. PATENT DOCUMENTS 2,809,726 A * 10/1957 Farquhar ............... E04B 1/6116
411/427
2,927,665 A * 3/1960 Haufgeorge .......... E04B 1/6803
181/290
(Continued)

FOREIGN PATENT DOCUMENTS

CN    101200261 A    6/2008
CN    103195511 A    7/2013
(Continued)

OTHER PUBLICATIONS

Search Report and Written Opinion issued in connection with corresponding IT Application No. 102016000014782 dated Oct. 12, 2016.
(Continued)

*Primary Examiner* — Christine T Cajilig
(74) *Attorney, Agent, or Firm* — Baker Hughes Patent Org.

(57) ABSTRACT

A fixing system for a panel, particularly for a noise absorption panel, including an omega stringer having a substantially omega-shaped cross-section, wherein the omega stringer includes a central portion and two lateral foot portions; a flat bar longitudinally directly connected to the
(Continued)

central portion of the omega stringer; a sealing gasket arranged longitudinally onto the lateral foot portions of the omega stringer or onto the flat bar; wherein height of omega stringer is selected so that, when a panel is clamped between the omega stringer and the flat bar, the sealing gasket is compressed between panel and fixing system.

9 Claims, 7 Drawing Sheets (51) Int. Cl.
| | |
|---|---|
| E04B 1/82 | (2006.01) |
| E04B 1/84 | (2006.01) |
| E04B 2/72 | (2006.01) |
| F16B 5/06 | (2006.01) |
| E04C 3/02 | (2006.01) |
| F01D 25/28 | (2006.01) |
| F02C 7/24 | (2006.01) |

(52) U.S. Cl.
CPC ............... *E04C 3/02* (2013.01); *F01D 25/28* (2013.01); *F02C 7/24* (2013.01); *F16B 5/0072* (2013.01); *F16B 5/0685* (2013.01)

(56) References Cited

U.S. PATENT DOCUMENTS

| | | | | |
|---|---|---|---|---|
| 3,485,405 | A | * | 12/1969 | Dement .................... B65D 9/34 217/65 |
| 4,028,856 | A | * | 6/1977 | Dalbec ....................... B63B 3/68 52/281 |
| 4,158,938 | A | * | 6/1979 | Meechan .................. E04B 1/12 52/309.11 |
| 4,300,323 | A | * | 11/1981 | Meechan ............. F16B 5/0072 52/461 |
| 4,794,206 | A | * | 12/1988 | Weinstein ............ H05K 9/0001 16/354 |
| 8,464,496 | B2 | * | 6/2013 | Cusson ................... H02S 20/24 52/745.06 |
| 8,733,027 | B1 | * | 5/2014 | Marston ................ F24S 25/636 52/24 |
| 9,068,764 | B2 | * | 6/2015 | Moore .................... E04D 3/366 |
| 2008/0127577 | A1 | | 6/2008 | Elmiger et al. |
| 2010/0236183 | A1 | | 9/2010 | Cusson |

FOREIGN PATENT DOCUMENTS

| | | | | |
|---|---|---|---|---|
| DE | 10 2008 009 703 | A1 | | 8/2009 |
| DE | 10 2009 039 791 | A1 | | 3/2011 |
| DE | 102009039791 | A1 * | 3/2011 | ............. F24S 25/33 |
| DE | 10 2011 079 057 | A1 | | 1/2013 |
| EP | 2 161 102 | A2 | | 3/2010 |
| FR | 2 461 069 | A1 | | 1/1981 |
| FR | 2 468 782 | A1 | | 5/1981 |
| FR | 2733261 | A1 * | 10/1996 | .......... E04B 1/8218 |
| FR | 2 749 620 | A1 | | 12/1997 |
| FR | 2749620 | A1 * | 12/1997 | ............ E01F 8/0017 |
| GB | 2513215 | A | | 10/2014 |
| JP | S59138643 | A | | 8/1984 |
| WO | 2009/113889 | A1 | | 9/2009 |
| WO | 2013/092682 | A2 | | 6/2013 |

OTHER PUBLICATIONS

International Search Report and Written Opinion issued in connection with corresponding PCT Application No. PCT/EP2017/052518 dated Apr. 24, 2017.

International Preliminary Report on Patentability issued in connection with corresponding PCT Application No. PCT/EP2017/052518 dated Aug. 14, 2018.

Fan Yingtao et al., "Brief Introduction of Siemens V94.3A Gas Turbine Enclosure System", Heat turbine, vol. No: 35, Issue No. 2, pp. 87-91, Jun. 2006.

* cited by examiner

Fig. 8

FIXING SYSTEM FOR PANELS AND TURBOMACHINE ENCLOSURE COMPRISING SUCH SYSTEM

BACKGROUND OF THE INVENTION

The subject matter of the present disclosure relates to a fixing system for panels, particularly for panels designed for noise absorption, and a turbomachine enclosure comprising such system.

The present disclosure is valid regardless the panel's material and inner layers composition.

A turbomachine normally requires an enclosure configured to separate the outer environment from the installation room dedicated to the turbomachine. For safety reasons, the space defined by the enclosure, wherein the turbomachine is located, is in general pressurized (negative pressure is also used in some applications). The enclosure is therefore configured to be gas tight.

BRIEF DESCRIPTION OF THE INVENTION

The enclosure comprises a frame surrounding the turbomachine. A plurality of panels is installed on the frame to form the enclosure.

In the current state of the art, the frame is a support for the panels, in particular each panel is fixed on a corresponding portion of the frame using fastening devices such as bolts with nuts, or the like. In detail, to ensure a proper fastening, the panel and the corresponding portion of frame are bored, to receive the fastening device and realize the fastening.

Figure 1:
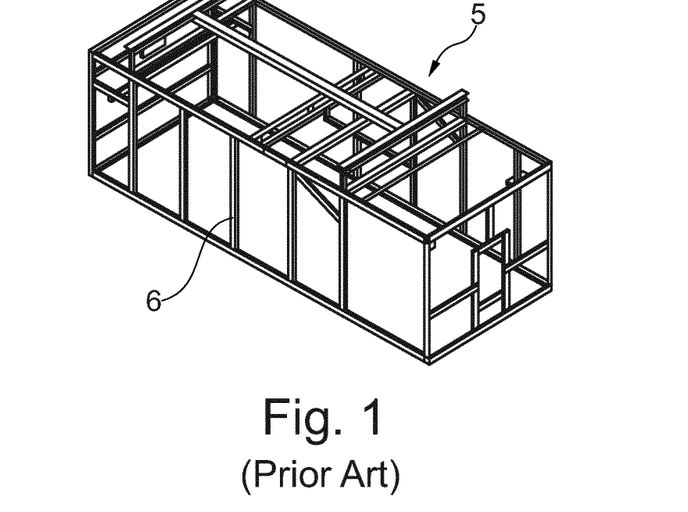
FIGS. 1 and 2 are schematic views of embodiments of a fixing system known from the prior art.
Figure 2:
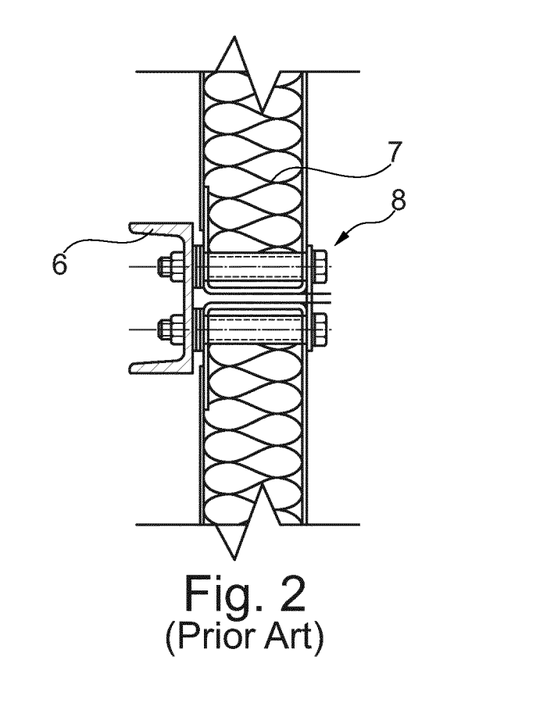

FIGS. 1 and 2 show this solution known from the state of the art.

FIG. 1 shows a frame 5 of an enclosure for a turbomachine comprising a plurality of portions 6 (stringers).

FIG. 2 shows the fastening of a panel 7 with one portion 6 of the frame 5 (not shown in figure) via the bolt with nut 8. It is noted that the bolt with nut 8 passes through the panel 7 and through the portion 6. Therefore the panel 7 and the portion 6 of the frame 5 must be bored in advance.

SUMMARY OF THE INVENTION

The main drawbacks of the fixing system according to the state of the art are the time required for the installation, the fact that holes need to be machined and reinforced in the panel and the impact on footprint of the enclosure.

Currently, to properly install a fixing system a plurality of preliminary operations are required, like boring the panel to be installed, foreseen bushing inside the panels etcetera. This lend to a long time for production, installation, and to a long time for maintenance too, if dismounting a panel is required.

In addition, the fastening of known fixing systems introduce a mechanical weakness, caused from the bores on the panel and on part of the frame. This further causes air leakage from inside the enclosure to the outside, therefore a robust and over dimensioned pressurizing system of the plant must be provided. When dealing with composite sandwich panels, special care needs to be taken in machining holes and installation of bushings to ensure integrity of the inner layers of the panel, avoiding contamination from the environment.

Furthermore, the footprint of the enclosure is determined by the sum of the thickness of the frame and the thickness of the panels, which are installed over the stringers of the frame.

A first embodiment of the invention therefore relates to a fixing system for an panels comprising:

an omega stringer having a substantially omega-shaped cross-section, wherein the omega stringer comprises a central portion and two lateral foot portions;

a flat bar longitudinally connected to the central portion of the omega stringer, so that a direct contact of the flat bar and the central portion of the omega stringer is achieved; a sealing gasket arranged longitudinally onto the lateral foot portions of the omega stringer or onto the flat bar;

wherein height of omega stringer is selected so that, when a panel is clamped between the omega stringer and the flat bar, the sealing gasket is compressed between panel and fixing system.

In an embodiment, with this fixing system the time for installation and maintenance is reduced, since a plug and play fixing system is achieved.

Furthermore, this fixing system allows the utilization of composite panels without the risk of damaging inner composite layers, avoiding possible contamination from the environment and minimizing pressure leakages.

Also in an embodiment, the footprint of the enclosure is significantly reduced, since with embodiments as described above, the panel is flush with the frame.

BRIEF DESCRIPTION OF THE DRAWINGS

Further details and specific embodiments will refer to the attached drawings, in which.

Figures from 3A to 3C show different embodiments of a fixing system.

DETAILED DESCRIPTION

The following description of exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
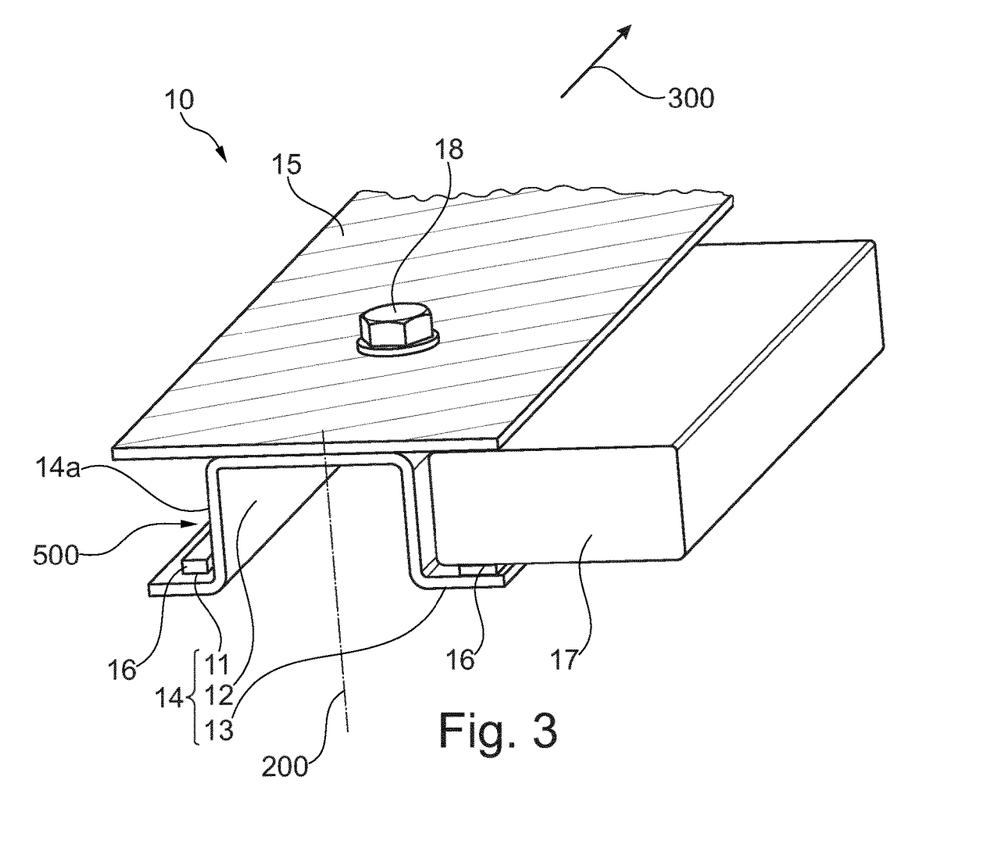
FIG. 3 is a perspective view of a first embodiment of a fixing system.

FIG. 3 shows an embodiment of a fixing system 10 for a panel 17 comprising an omega stringer 14 having a substantially omega-shaped cross-section.

The omega stringer 14 comprises in turn:
a central portion 12;
two lateral 11, 13 foot portions, in particular: a first foot portion 11 and a second foot portion 13 symmetric each other with respect to the axis 200 of symmetry of the omega stringer 14.

In one embodiment, the omega stringer 14 is a portion of the frame of the turbomachine enclosure.

The fixing system 10 further comprises a flat bar 15 longitudinally connected, namely along the direction concordant to the one indicated by the arrow 300, to the central portion 12 of the omega stringer 14. The omega stringer 14 and the flat bar 15 are directly connected and in contact each other. A sealing gasket 16 is arranged longitudinally onto the lateral foot portions 11, 13 of the omega stringer 14. For clarity reasons, just one side of the omega (the side of the foot portion 13) is shown accommodating a panel 17 and comprising the sealing gasket 16.

As shown in FIG. 3, the space 500 is defined between the outer portion 14a of the omega stringer 14, the gasket 16 and the flat bar 15. In the space 500, the panel 17 is firmly housed.

It is further appreciated that with this arrangement the panel 17 is flush with omega stringer 14.

Figure 3A:
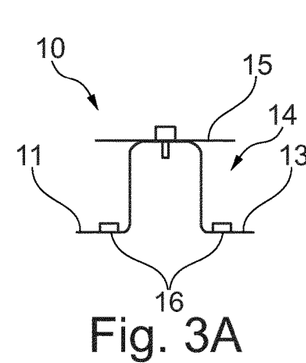
Figure 3B:
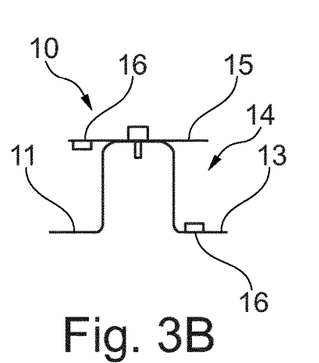
Figure 3C:
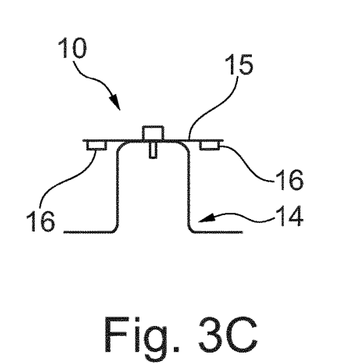

Figures from 3A to 3C show different embodiments relating to different possible arrangements of the sealing gasket 16.

In FIG. 3A, the fixing system 10 has two sealing gaskets 16, both arranged on foot portions 11, 13 of the omega 14.

In FIG. 3B, the fixing system 10 has two sealing gaskets 16, one arranged on the flat bar 15 and one arranged on one foot portion 13 of the omega stringer 14.

In FIG. 3C, the fixing system 10 has two sealing gaskets 16, both arranged on the flat bar 15.

The height of the omega 14 stringer is selected so that when the panel 17 is clamped between the omega stringer 14 and the flat bar 15, the sealing gasket is compressed between the between panel 17 and the fixing system 10.

Figure 4:
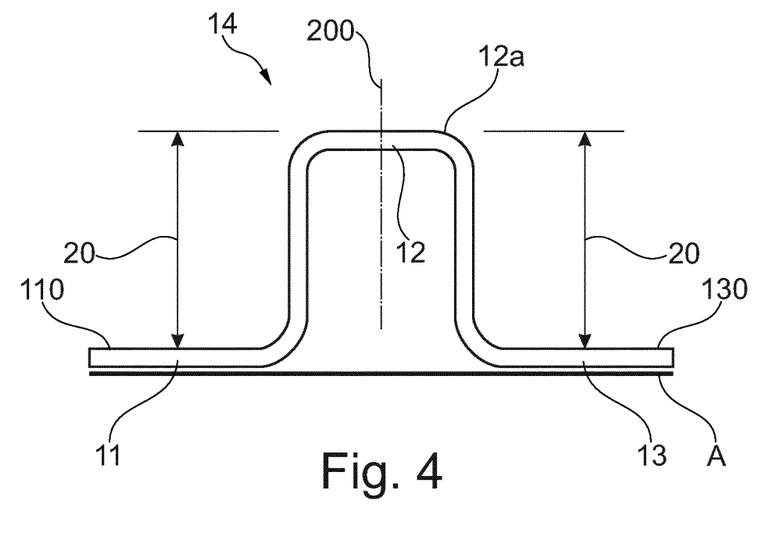
FIG. 4 is a schematic view of a component of a fixing system.

FIG. 4 shows the height of a omega stringer 14. In the embodiments described, the height 20 is defined as the distance between the upper surface 110, 130, considered with respect to a floor plane A, of the foot portions 11, 13 and the upper surface 12a of the central portion 12. Therefore, its height 20 is selected so that when a panel 17 is installed, the gasket 16 is compressed and the flat bar 15 is in abutment with the surface of the panel 17.

Figure 5:
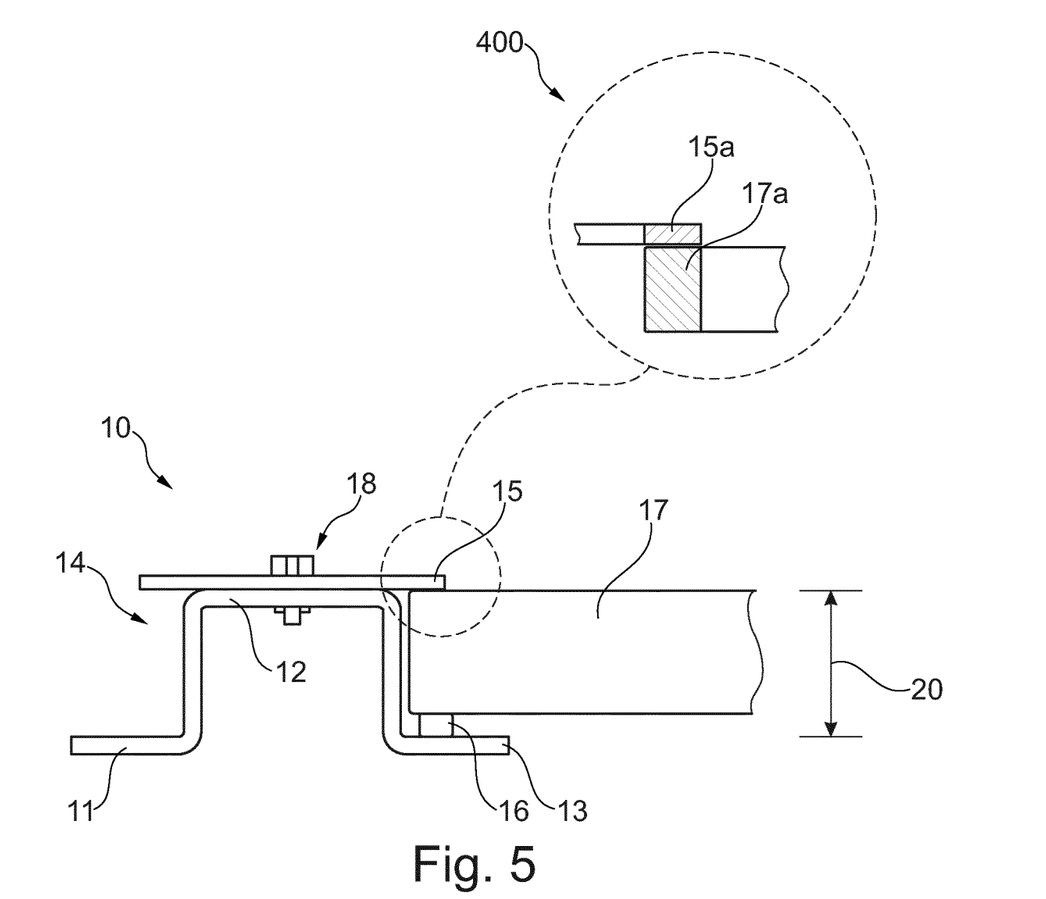
FIG. 5 is a schematic view of the embodiment of FIG. 3.

FIG. 5 shows a schematic view of the embodiment of FIG. 3. The foot portions 11, 13 of this embodiment have a substantially rectangular cross section. The height 20 of the omega 14 allows compressing the gasket 16 of a compression rate of at least 30% of its height.

Furthermore, as shown in the enlarged portion 400, the overlapping portions 15a and 17a between the flat bar 15 and the panel 17, namely the portion of flat bar in abutment with the portion of panel 17, is each time selected to ensure proper clamping of the panel 17 with the fixing system 10.

In one embodiment of the fixing system 10, the flat bar is connected to the central portion 12 of the omega 14 stringer by means of a plurality of connecting means 18.

The thickness of omega stringer 14 is substantially equal to the thickness of the bar 15.

In the embodiment shown in FIG. 5, such connecting means 18 are bolts with nuts. In one alternative embodiment, the connecting means 18 are rivets. In one alternative embodiment, the connecting means 18 are nails. In one alternative embodiment, the connecting means 18 are lever closures.

In use, the compressed gasket 16 brings about two effects. The first effect is to ensure a proper gastight. The second effect is to increase the frictional coefficient that the panel 17 experiences when a bending force is applied.

In this way, a proper gastight of the enclosure is ensured, as well as a good mechanical behavior.

Figure 6:
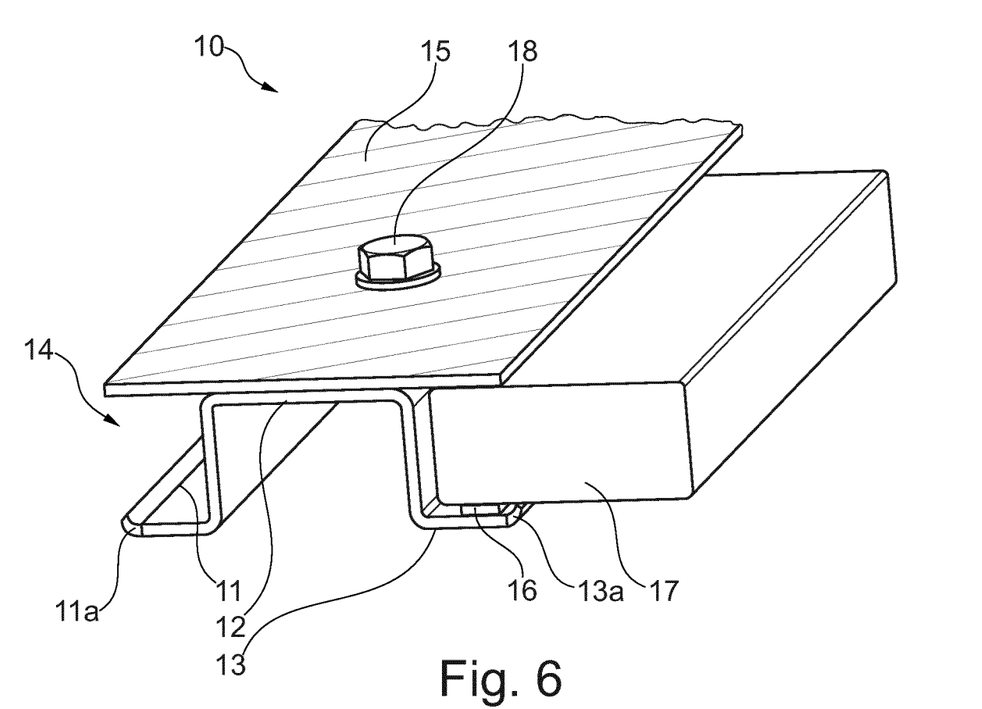
FIG. 6 is a perspective view of a second embodiment of a fixing system.

FIG. 6 shows a further embodiment of a fixing system 10. The fixing system 10 of FIG. 6 is substantially similar to the one of FIG. 3, therefore the same considerations may be done. Except for the omega stringer 14, which comprises a serif 11a, 13a on the foot portions 11, 13 configured to limit the compression of the sealing gasket 16 when the panel 17 is clamped between the omega stringer 14 and the flat bar 15.

In one alternative embodiment, the serif may be defined on the flat bar 15.

Figure 7:
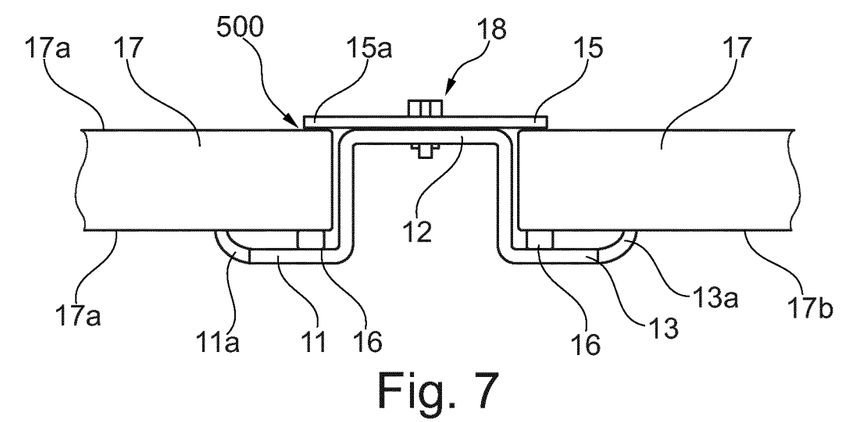
FIG. 7 is a schematic view of the embodiment of FIG. 6.

FIG. 7 shows an embodiment of a fixing system 10 wherein the omega stringer 14 comprises serif 11a, 13a on its foot portions 11, 13. In particular the serif 13a is on the terminal part of the foot portion 13; as well as the serif 11a is on the terminal part of the foot portion 11. In use, the panel 17 is housed in the space 500 (see also FIG. 3). A portion of the upper surface 17a of the panel 17 is in abutment with a portion of the lower surface 15a of the flat bar 15. The serif 11a is in abutment with the lower surface 17b (opposite to the upper surface 17a) of the panel. The gasket 16 is compressed.

Figure 7A:
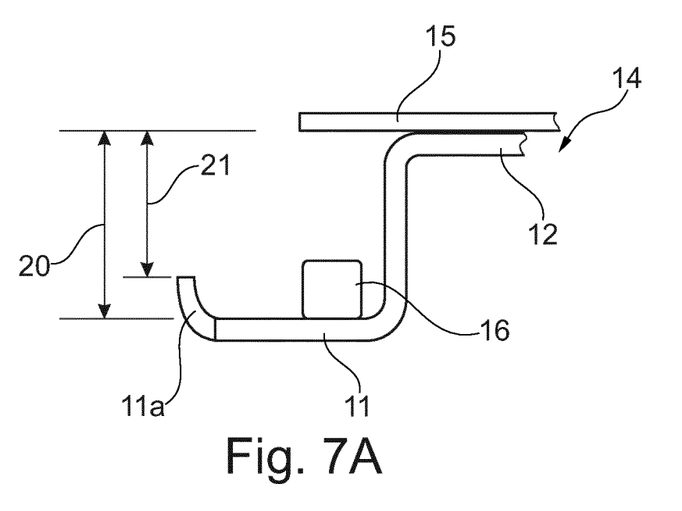
FIG. 7A shows a component of the embodiment of FIG. 6.

FIG. 7A shows a portion of omega 14 stringer with a serif 11a on its foot portion 11. It is noted that the overall height 20 of the omega 14 is defined in the same way of the omega 14 without serif of FIG. 4. Furthermore, the omega 14 with the serif 11a has an operative height 21, wherein the panel may be housed. Such operative height 21 is defined as the distance between the upper surface of the serif 11a and the upper surface of the central portion 12. In this way, the compression of the gasket 16 is controllable.

Figure 8:
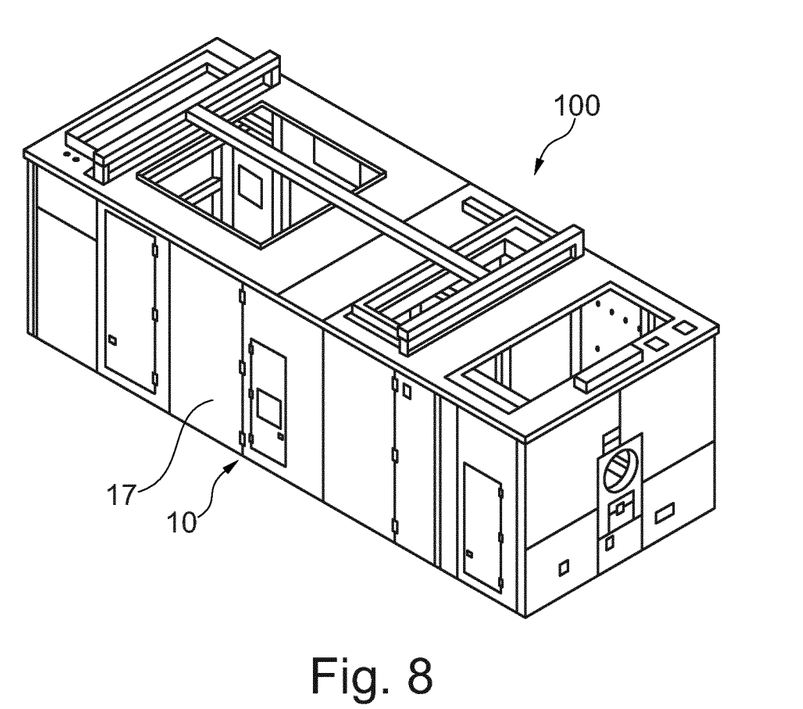
FIG. 8 is a perspective view of a turbomachine enclosure comprising a fixing system.

FIG. 8 shows an embodiment of a turbomachine enclosure 100 comprising:
a frame realized with fixing systems 10, of the type described above connected each other, a plurality of composite panels wherein the composite panels are clamped to the frame by means of the fixing systems 10 and the frame is arranged so to cover the turbomachine.

In one embodiment, the turbomachine enclosure described above is configured to be gastight.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A fixing system for a composite panel comprising:
an omega stringer having a substantially omega-shaped cross-section extending along a longitudinal axis of the omega stringer, the omega stringer comprising a central portion having an upper surface and two lateral foot portions each defining a respective terminal part;
a bar having lower surface and a substantially rectangular-shaped cross-section extending fully across a width of the bar and fully along a longitudinal axis of the bar, the lower surface of the bar directly coupled to the upper surface of the central portion of the omega stringer such that the longitudinal axis of the bar and the longitudinal axis of the omega stringer are parallel with each other;

a sealing gasket arranged longitudinally onto a surface of each of the lateral foot portions of the omega stringer;

a serif arranged on the respective terminal part of each of the lateral foot portions of the omega stringer, wherein the sealing gasket extends a first height relative to the surface of the respective lateral foot portion and the serif extends a second height relative to the surface of the respective lateral foot portion, the second height less than the first height to limit the compression of the sealing gasket when the panel is clamped between the omega stringer and the bar, and when a panel is clamped between the serif and the bar, a portion of an upper surface of the panel is in abutment with a portion of the lower surface of the bar, a portion of a lower surface of the panel opposite the upper surface of the panel is in abutment with the serif such that the serif does not penetrate into the panel, and the sealing gasket is compressed between the lower surface of the panel and one of the two lateral foot portions to form a gastight seal.

2. The fixing system according to claim 1, wherein the sealing gasket is configured such that when the panel is clamped between the serif and the bar, the sealing gasket is compressed with a compression rate of at least 30% of the sealing gasket height.

3. The fixing system according to claim 1, wherein the bar is coupled to the central portion of the omega stringer by a plurality of mechanical fasteners.

4. The fixing system according to claim 3, wherein the mechanical fasteners are bolts with nuts, rivets, nails or lever closure.

5. The fixing system according to claim 1, wherein a width of the bar has a width greater than a width of the central portion of the omega stringer.

6. The fixing system according to claim 5, wherein a width of the bar has a width substantially equal to a width of the omega stringer.

7. The fixing system according to claim 1, wherein a thickness of omega stringer is substantially equal to a thickness of the bar.

8. A turbomachine enclosure comprising:

a frame fixing systems according to claim 1; and panels, wherein the panels are clamped to a frame of the turbomachine enclosure by the fixing systems and the frame is arranged so as to cover the turbomachine.

9. The turbomachine enclosure according to claim 8 wherein the panels are noise absorption panels.

* * * * *